Jan. 17, 1956  D. W. KO ET AL  2,731,333
METHOD OF FORMING ORNAMENTED SURFACES
Filed May 13, 1954  2 Sheets-Sheet 1

INVENTORS:—
DAVID W. KO
WESLEY KO
WILLIAM M. AUCHENBACH

BY Arthur N. Klein
ATTORNEY

Jan. 17, 1956    D. W. KO ET AL    2,731,333
METHOD OF FORMING ORNAMENTED SURFACES
Filed May 13, 1954    2 Sheets-Sheet 2

INVENTORS:—
DAVID W. KO
WESLEY KO
WILLIAM M. AUCHENBACH
BY Arthur N. Klein
ATTORNEY

United States Patent Office 2,731,333
Patented Jan. 17, 1956

2,731,333

METHOD OF FORMING ORNAMENTED SURFACES

David W. Ko, Wesley Ko and William M. Auchenbach, Philadelphia, Pa., assignors to Komak, Inc., Philadelphia, Pa., a corporation of Pennsylvania Application May 13, 1954, Serial No. 429,574

3 Claims. (Cl. 41—43)

The present invention relates to the treatment of surfaces of metal-nonmetal laminates and it relates more particularly to the formation of decorative or ornamental effects and of insignia, indicia, and the like upon metal-on-nonmetal laminates, by an etching or intaglio process which provides suitable contrasts by making the underlying nonmetal material visible in contrast to the main metal outer surface.

An object of the present invention is to provide a new and useful method of forming ornamented or otherwise marked surfaces. Another object of the present invention is to provide a novel method of ornamenting or otherwise marking the surface of a metal-on-nonmetal laminate, as well as to provide new and useful articles of manufacture formed thereby. A further object of the present invention is to provide a relatively simple and inexpensive process for forming etched or intaglio decorated or otherwise marked surfaces upon metal-on-plastic laminates, and also to provide new and useful articles of manufacture produced thereby.

Other objects and advantages of the present invention are apparent in the following detailed description, appended claims and accompanying drawings.

It has heretofore been suggested to deposit relative thin outer sheets or films of metallic material upon nonmetallic bases to form laminates. It has also been suggested to print upon the metal surface with an acid-resistant ink or the like and thereafter to etch away the uncoated metal so as to leave metal only in the areas of the print. The latter process has been used especially in the formation of so-called "printed" electrical circuits, in which strips of conducting material are thus formed on a base of synthetic resin having appropriate dielectric properties and replace the conventional electrical wires of the circuit.

According to the present invention, it has been found that strikingly attractive and beautiful effects, ornamental as well as utilitarian, can be achieved easily and inexpensively by a novel method of forming decorative or other appropriate etched or intaglio markings upon the surface of a metal-on-nonmetal laminate, and more particularly a laminate comprising one or more superimposed coatings of different-colored metal, upon a contrastingly colored base of synthetic resin or the like.

For the purpose of illustrating the invention, there are shown, in the accompanying drawings, forms thereof which are presently preferred; it being understood, however, that the invention is not limited to the precise arrangements and instrumentalities illustrated.

Referring to the accompanying drawings in which like reference characters indicate like parts throughout:

Figure 1:
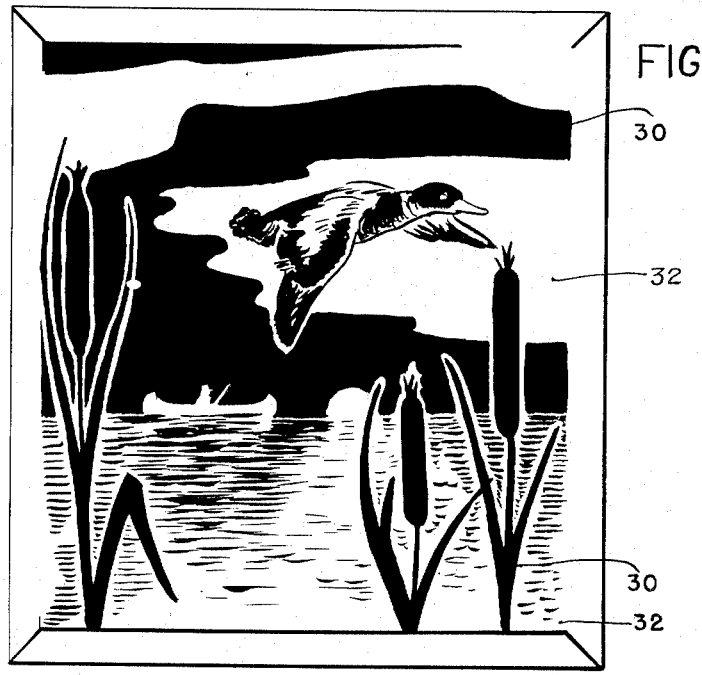
Figure 1 is a front elevational view of an ornamental plaque forming one embodiment of the present invention; the design having been formed by partial etching of a light-colored metal coating on a dark-colored synthetic resin base.

In Fig. 1 there is shown an ornamental plaque having a two-tone ornamental design formed by partial removal of a light-colored metal coating on a dark-colored synthetic resin base.

The base 30 may be formed of any suitable synthetic resin, either opaque or light-transmitting. Where an opaque synthetic resin is employed, it is preferably of a color which contrasts with the color of the metal coating. Thus, where the metal is light in color, the synthetic resin is preferably dark in color. On the other hand, where a relatively dark colored metal is employed, the synthetic resin is preferably lighter in color than the metal.

A wide range of synthetic resins can be used for this purpose, including, for example, Bakelite or other phenol-formaldehyde resin, nylon, silicone resin, Teflon, Epoglass, Plexiglass, fibreglass resin, and many others. Similarly, the metal coating may be of copper, brass, aluminum, nickel, silver, gold, and various other precious and non-precious metals, alloys and the like.

The metal coating may be applied to the resin plate in any conventional manner, known to those skilled in the art, as for example by electro-plating, spraying, dipping, laminating (under the action of heat and pressure), etc.

Where two or more superimposed coatings are employed, the individual coatings may be applied in different ways. Thus, for example, one coating may be applied by laminating and the second by electro-plating, and vice versa.

For purposes of illustration, in the following example, the base 30 is described as being of dark-colored phenol-formaldehyde synthetic resin and the metal surface 32 is described as being of copper.

Figure 2:
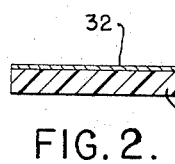
Figure 2 is a fragmentary cross-sectional view of the original non-etched metal-on-resin plate, from which the plaque of Fig. 1 is formed by means of the successive steps illustrated in Figs. 3-5.

Starting with the copper-on-resin laminate, as shown in Fig. 2, the first step in the formation of the ornamental plaque of Fig. 1 is the imprinting upon the copper surface 32 of an appropriate ornamental design 34 of acid resist. The resist coating is of conventional composition, well known to those skilled in the art, and comprising essentially a quick-drying ink capable of adhering to the metal surface and of resisting the action of the etching agent to be thereafter employed.

One manner of applying the resist coating 34 is by using a silk screen stencil. In such case, a black-on-white drawing of the design is first made, after which a photographic negative is made from the drawing. A photographic positive is then made from the negative and is employed to make the photographic silk screen stencil in a manner well known to those skilled in the art. The stencil is mounted in a frame which is then employed to print onto the metal surface in conventional manner.

The print is then dried (optionally force-dried by heating at about 170° F. for about two minutes) after which the laminate is ready for etching.

While silk screen printing has been found particularly desirable for application of the design upon the metal-resin laminate, and is presently preferred for that purpose, this invention is not limited to the use of silk screen printing. Thus, any conventional method of applying ink or the like in appropriate design upon a metal surface can be employed instead.

Figure 3:
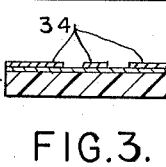
Figure 3 is a fragmentary cross-sectional view like that of Fig. 2, showing the appearance of the plate after an acid resist has been imprinted thereon in an appropriate design.
Figure 4:
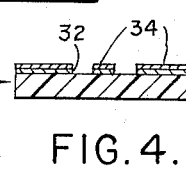
Figure 4 is a view like those of Figs. 2 and 3 but showing the appearance of the plate after the unprotected portions of the metal coating have been etched away, to expose the underlying resin base.

After the resist coating 34 has been applied to the metal surface as indicated in Fig. 3, the plate is etched to remove the unprotected areas of the copper coating 32, so as to expose the underlying resin plate 30, as indicated in Fig. 4.

This etching can be done, for example, by immersing the plate in a solution of ferric chloride, 40° Baumé at approximately 70° F. for about three minutes in a paddle-type etcher. A longer time (about thirty minutes) is required in tank etching.

Instead of etching with a chemical solution, it is possible to etch electrolytically by immersing the plate in a salt solution and connecting the metal layer as the anode of an electrolytic circuit, whereby closing of the circuit causes the metal to dissolve off the plate in a manner well known to those skilled in the art.

Figure 5:
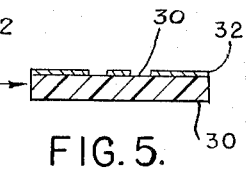
Figure 5 is a view like those of Figs. 2-4 but showing the appearance of the etched plate, after removal of the resist.

The etched plate is then rinsed off and the resist coating 34 is removed by soaking for several minutes in mineral spirits or any other suitable solvent so as to expose the underlying copper surface 32 as indicated in Fig. 5.

In other words, after the etching and the subsequent removal of resist, the dark-colored resin plate 30 is visible at those areas which were not protected by the resist, while the copper surface is visible at the remaining areas of the laminate.

The metal surface 32 is then polished and the entire surface is covered with a clear protective coating of lacquer or other suitable material, by spraying, dipping or any other appropriate manner.

Prior to the application of the clear protective coating, it is possible to treat the surface of the laminate in various ways so as to enhance its ornamental appearance. These supplemental operations may include silk screen printing, hand painting, electroplating, molding or post-forming of the borders or other parts of the resin plate, etc.

The plaque of Fig. 1 can be mounted directly upon a wall or can be enclosed within a suitable frame in an obvious manner.

Figure 20:
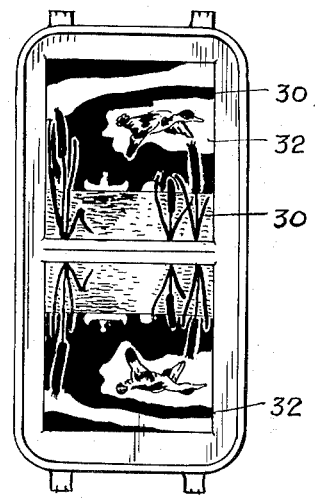
Figure 20 is a top plan view of a table top with a pair of ornamental plaques, similar to that of Fig. 1, set in to form a more or less integral part thereof.

Instead of being employed as separate pictures or the like, plaques like that of Fig. 1 can be set into table tops in the manner indicated in Fig. 20. Such table tops may be of wood, with the plaques adhesively secured thereto in a manner similar to that now employed with leather inserts.

Where the table top is of molded laminated synthetic resin (such as are now commonly employed on kitchen and dinette tables) the ornamental plaque may be molded flush with or covered over by the outermost transparent synthetic resin layer of the table top so as to form a more or less integral part thereof.

By employing larger size plaques, it is possible to construct entire table tops thereof (in lieu of the inserts of Fig. 20); the frame of the table or other article of furniture being fastened directly to the underside of the synthetic resin base in any conventional manner.

In Figs. 6–12, there is indicated the manner of forming a three-color ornamented metal-on-resin laminate by selective printing and etching of two superimposed coatings of different metals, in which the metal of the outermost coating is higher in the electromotive series than the metal of the undercoating.

Figure 6:
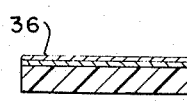
Figure 6 is a fragmentary cross-sectional view, like that of Fig. 2, but showing two superimposed metal coatings, namely an outermost base metal coating and an undercoating of precious metal, upon a contrastingly colored synthetic resin base.

For purposes of illustration, there is shown, in Fig. 6, a synthetic resin plate 30 having a coating 32 of precious metal (as for example gold) and an outermost coating 36 of a base metal (as for example nickel).

Figure 7:
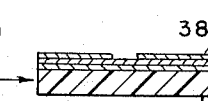
Figure 7 is a view like that of Fig. 6 but showing a resist coating imprinted thereon in an appropriate design.

A resist coating 38 is first applied to the outermost base metal coating 36 in an appropriate design, as indicated in Fig. 7.

Figure 8:
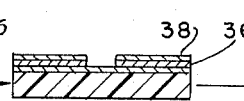
Figure 8 is a view showing the plate of Figs. 6 and 7 after the exposed areas of the outermost coating have been etched away by treatment with an etching agent which does not attack the precious metal.

Thereafter, the resist-coated laminate is treated with an etching agent (as for example hydrochloric acid or nitric acid) which will dissolve the unprotected areas of the outermost base metal coating, but will not attack the underlying precious metal coating, so that the underlying base metal coating is exposed at the unproteced areas, in the manner indicated in Fig. 8.

Figure 9:
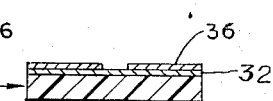
Figure 9 is a view showing the appearance of the plate of Fig. 8 after removal of the resist coating therefrom.

Thereafter, the resist is removed using mineral spirits, toluol or any other suitable solvent, to expose the remainder of the outermost base metal coating, as indicated in Fig. 9.

Figure 10:
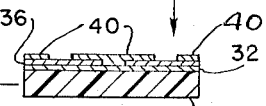
Figure 10 shows the appearance of the plate of Fig. 9 after the resist has been imprinted thereon in a new design.

A second resist coating 40 is then applied, in appropriate design, so as to expose their areas, as illustrated in Fig. 10. It is pointed out that, in the drawings, the thickness of the metal coatings is exaggerated, for clarity of illustration. In actual practice, the metal coatings are extremely thin (of the order of thousandths of an inch) so that, when the resist is imprinted onto the previously-etched bi-metal surface, it is capable of filling the recesses without difficulty and without appreciable impairment of the sharpness of the printed design.

Figure 11:
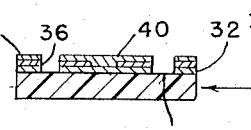
Figure 11 shows the appearance of the plate after the uncoated areas have been etched away by exposure to an etching agent capable of attacking both the base metal and precious metal layers.

The laminate is then treated with an etching agent (as for example aqua regia) capable of dissolving out both the outermost base metal coating and the underlying precious metal coating at the unprotected areas, so as to expose the underlying resin plate 30, as indicated in Fig. 11.

Figure 12:
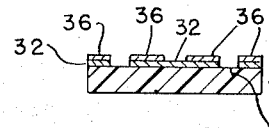
Figure 12 is a view showing the final appearance of the plate of Figs. 6-11 and indicating how both the resin base and the precious metal undercoating are visible, at different points, in contrast to the base metal outer coat, to form the final composite three-color design.

Finally, the resist coating 40 is removed, as indicated in Fig. 12, to make both the resin base and the underlying precious metal coating visible in different areas, in contrast to the outermost base metal coating.

The three-color laminate is then polished and provided with a clear protective coating in a manner similar to that described hereinabove.

Also, as described hereinabove, hand painting, silk screen printing, electro-plating, and other suitable ornamental operations can be performed on the surface of the embodiment of Figs. 6–12, prior to application of the clear protective coating.

In Figs. 13–19, there is indicated another method of forming a three-color ornamented metal-on-resin laminate by selective printing and etching of two superimposed coatings of different metals; the first etching operation dissolving out both metals in the unprotected areas, and the second etching operation dissolving out only the outermost metal layer in the unprotected areas.

Figure 13:
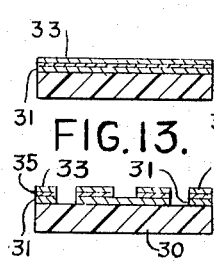
Figure 13 is a view like that of Fig. 6 showing two superimposed metal coatings, namely an outermost copper coating and an undercoating of aluminum, upon a synthetic resin base.

Thus, in Fig. 13, the synthetic resin plate is provided with an undercoating 31 of aluminum and an outermost coating 33 of copper; an intervening coating 35 of zinc being first applied to the aluminum undercoat, to make the copper adhere thereto.

Figure 14:
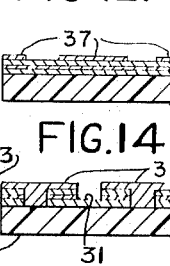
Figure 14 is a view like that of Fig. 13 but showing a resist coating imprinted thereon in an appropriate design.

A resist coating 37 is first applied to the copper surface 33 in an appropriate design, as indicated in Fig. 14.

Figure 15:
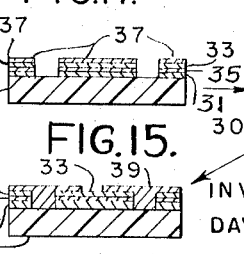
Figure 15 is a view showing the plate of Figs. 13 and 14 after the uncoated areas have been etched away by treatment with an etching agent capable of attacking both the copper layer and the aluminum layer.

The laminate is then treated with nitric acid which removes the copper and zinc in the unprotected areas, after which the laminate is washed and further etched with ferric chloride or sodium hydroxide to remove the aluminum and expose the synthetic resin base in the unprotected areas, as illustrated in Fig. 15.

Figure 16:
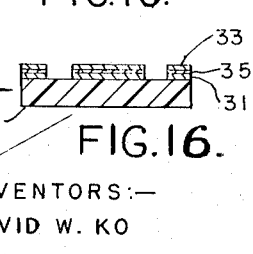
Figure 16 is a view showing the appearance of the plate of Fig. 15 after removal of the resist coating therefrom.

The first resist coating is then removed in the manner illustrated in Fig. 16.

Figure 17:
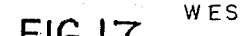
Figure 17 shows the appearance of the plate of Fig. 16 after the resist has been imprinted thereon in a new design.

A second resist coating is then applied in a new design; the resist filling the depressions formed during the first etching and exposing other areas of the outermost copper coating, as indicated in Fig. 17.

Figure 18:
Fig. 18 shows the appearance of the plate of Fig. 17 after the uncoated areas have been etched away by treatment with an etching agent capable of attacking only the outer copper layer.

The laminate is then treated with an etching agent, as for example nitric acid, which will dissolve the outermost copper coating and the intervening zinc coating in the unprotected areas, without attacking the aluminum undercoat, in the manner indicated in Fig. 18.

Instead of etching chemically at this stage, it is possible to etch electrolytically, by immersing the laminate in a solution of an electrolyte and connecting the copper as the anode of an electric circuit, so as to dissolve off the copper and the zinc without affecting the aluminum, in a manner known to those skilled in the art.

It is also possible to remove the greatest part of the copper electrolytically, at this stage, and to remove the last traces of unprotected copper chemically. This latter procedure may be preferred over complete electrolytic etching because the latter is sometimes ineffective to remove the last traces of metal which become isolated from the area of electrical contact.

Figure 19:
Figure 19 is a view showing the final appearance of the plate of Figs. 13-18 after removal of the resist, and indicating how both the resin base and the aluminum undercoating are visible, at different points, in contrast to the copper outer coating.

After the second etching operation has been completed, the second resist coating is removed so as to make both the synthetic resin base and the underlying aluminum coating visible in different areas, in contrast to the outermost copper coating, in the manner illustrated in Fig. 19.

In Figs. 21–27 there is shown another embodiment of the present invention comprising a front panel for a portable radio or the like, in which the trade-mark or trade-name, tuning-dial numbers, switch insignia, etc., are formed, in contrastingly colored metal, on the outer side of a non-conductor synthetic resin plate, while an electrically-conducting printed circuit is formed on the inner side of the plate.

Figure 21:
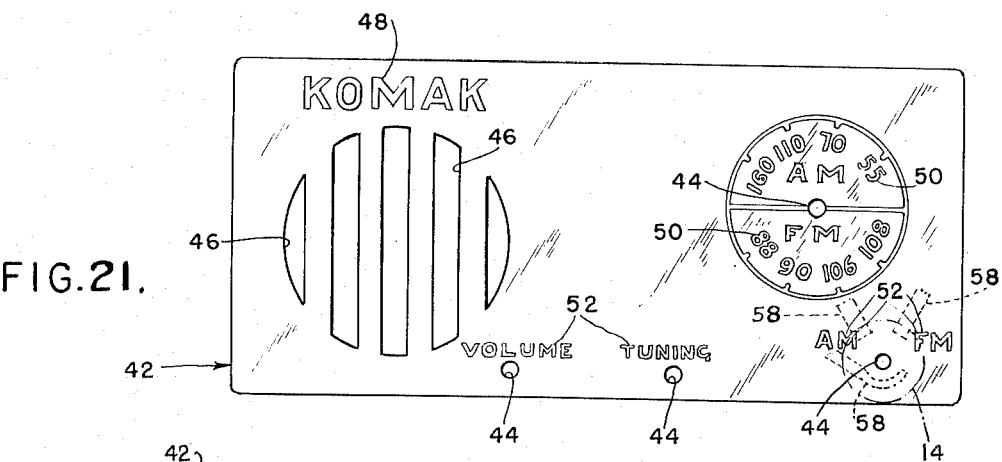
Figure 21 is a front elevational view of the front panel of a portable radio showing the name, tuning-dial insignia, and switch insignia formed, in contrastingly colored metal overlay on a dark-colored synthetic resin base, in accordance with the present invention.

Thus, as indicated particularly in Fig. 21, the plate 42 (which may be of Bakelite or other appropriate non-conductor synthetic resin) can be provided with suitable shaft openings 44 as well as loud-speaker slits 46.

A manufacturer's name or trade-mark 48, tuning-dial numbers 50 and switch insignia 52 can be formed on the outer face of the plate 42 by printing on an outer metallic coating 54 with a resist 56, etching away the unprotected areas of the metal coating, and thereafter dissolving off the resist, in a manner to be more fully described hereinbelow.

Figure 22:
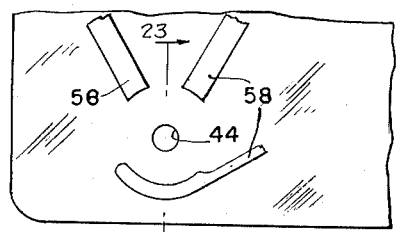
Figure 22 is a fragmentary elevational view showing a printed electrical circuit formed on the inner side of the panel of Fig. 21.

A printed circuit 58 of electrically conducting metal can be formed on the inner face of the plate 42, as indicated in the fragmentary view of Fig. 22, which shows the band-switch part of the circuit.

The printed circuit is formed by imprinting a suitable resist coating 60 of electrically conducting metal or the like; subsequently etching away the unprotected areas of the coating, and finally dissolving away the resist coating.

The various steps of forming the panel of Fig. 21 are illustrated in Figs. 23–27.

Figure 23:
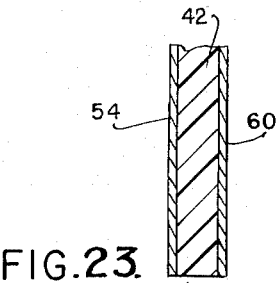
Figure 23 is a fragmentary cross-sectional view showing the appearance of the panel of Figs. 21 and 22 at a preliminary stage of formation; that is, with a coating of contrastingly colored metal applied to the outer surface and a coating of electrically conducting metal applied to the inner surface of the synthetic resin panel, in which shaft holes and the like have not yet been formed.

Thus, Fig. 23 is a fragmentary cross-sectional view of the panel taken generally along the line 23—23 of Fig. 22 but before the shaft holes and loud speaker slits have been formed therein; the outer metallic coating 54 and the inner conducting metal coating 60 being shown as applied to the outside and inside faces of the synthetic resin plate 42.

Figure 24:
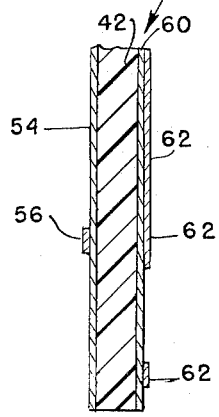
Figure 24 is a view like that of Fig. 23 but showing resist imprinted upon the respective metal coatings in appropriate designs.

In Fig. 24, the resist coatings 56 and 62 are shown as applied to the surfaces 54 and 60 respectively in appropriate designs.

Figure 25:
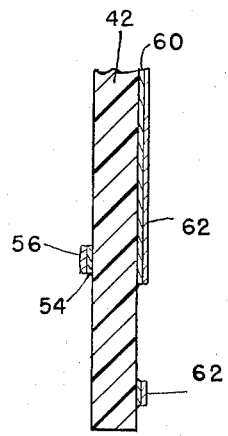
Figure 25 shows the appearance of the panel of Figs. 23 and 24 after the unprotected areas of the respective metal coatings have been etched away, exposing the resin base.

Fig. 25 shows the appearance of the laminate after the unprotected portions of the coatings 54 and 60 have been etched away, employing ferric chloride or other suitable etching agent.

Figures 26, 27:
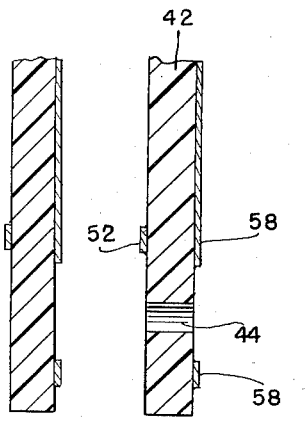
Figure 26 is a view showing the appearance of the panel of Figs. 23–25 after removal of the resist.
Figure 27 is a view showing the final appearance of the panel of Figs. 23–26 after formation of the shaft hole 44 therein.

In Fig. 26, the resist coatings have been removed so as to expose the switch insignia 52 (as well as the trade-mark 48 and tuning-dial numbers 50) on the outside surface and to expose the printed circuit 58 on the inside surface of the resin plate 42.

Fig. 27 shows the appearance of the laminate after the shaft holes 44 (and also the loud-speaker slits 46) have been formed therein.

The metal surfaces are then polished and covered with a protective coating, except at those parts of the printed circuit 58 where electrical contact, wiping contact or soldering is necessary.

The present invention may be embodied in other specific forms and, therefore, the foregoing embodiments are to be considered merely as illustrative and not restrictive, reference being made to the appended claims as indicating the scope of this invention.

Having thus described our invention, we claim as new and desire to protect by Letters Patent the following:

1. A method of forming an ornamented surface which includes the steps of forming a laminate comprising at least two layers of different metals upon a nonmetal base; applying a coating of resist material, in appropriate design, to the outermost metal surface; treating the resist-coated laminate so as to remove the metal in the areas not covered by the resist; removing the resist coating; applying a second coating of resist material in a different design; treating the resist coated laminate so as to remove the metal in the areas not covered by the resist; and subsequently removing the second resist coating; one of the metal-removing operations being such that both metal layers are removed thereby, while the other metal-removing operation is such that only the metal of the outermost layer is removed thereby; whereby the nonmetal base and the under metal layer are visible in different areas in contrast to the outer metal coating.

2. A method according to claim 1 wherein only the outer metal coating is removed in the unprotected areas during the first etching operation, and wherein both metal coatings are removed in the unprotected areas during the second etching operation.

3. A method according to claim 1 wherein both metal layers are removed in the unprotected areas during the first etching operation, and wherein only the outer metal layer is removed in the unprotected areas during the second etching operation.

References Cited in the file of this patent

UNITED STATES PATENTS 2,441,960     Eisler _____ May 25, 1948